United States Patent [19]

Shimano

[11] Patent Number: 5,277,333
[45] Date of Patent: Jan. 11, 1994

[54] APPARATUS FOR METERING AND DISCHARGING A LIQUID

[75] Inventor: Ichiro Shimano, Tokyo, Japan

[73] Assignee: Musashi Engineering, Inc., Tokyo, Japan

[21] Appl. No.: 836,011

[22] PCT Filed: Jul. 10, 1990

[86] PCT No.: PCT/JP90/00888

§ 371 Date: Feb. 28, 1992

§ 102(e) Date: Feb. 28, 1992

[87] PCT Pub. No.: WO92/00813

PCT Pub. Date: Jan. 23, 1992

[51] Int. Cl.⁵ .............................. B67D 5/30
[52] U.S. Cl. ........................... 222/14; 222/55; 222/61; 222/639
[58] Field of Search .............. 222/14, 55, 57, 61, 222/639, 644

[56] References Cited

U.S. PATENT DOCUMENTS

| | | | |
|---|---|---|---|
| 2,710,115 | 6/1955 | Chandler | 222/61 |
| 3,708,088 | 1/1973 | Lesher | 222/70 |
| 4,274,552 | 6/1981 | Proni | 222/61 |
| 4,376,172 | 3/1983 | Belangee et al. | 222/57 X |
| 4,810,659 | 3/1989 | Higo et al. | 222/309 X |
| 4,874,444 | 10/1989 | Satou et al. | 222/61 X |
| 4,989,756 | 2/1991 | Kagamihara et al. | 222/55 |
| 5,031,805 | 7/1991 | Rohmann | 222/61 X |
| 5,188,258 | 2/1993 | Iwashita | 222/61 |

FOREIGN PATENT DOCUMENTS

| | | | |
|---|---|---|---|
| 0375462 | 6/1990 | European Pat. Off. | 222/639 |
| 1435806 | 10/1964 | France | |
| 1216778 | 9/1986 | Japan | 222/55 |
| 2088011 | 4/1987 | Japan | 222/639 |

OTHER PUBLICATIONS

Japanese Patent Laid-open No. 63-97259-Japanese Patent Appln. No. 61-242992.

Primary Examiner—Andres Kashnikow
Assistant Examiner—Kenneth Bomberg
Attorney, Agent, or Firm—Dvorak and Traub

[57] ABSTRACT

An apparatus for accurately dispensing a predetermined amount of viscous liquid such as conductive adhesive, cream solder and the like. The apparatus includes a first pressure sensor arranged in a pipe line connected between a dispensing solenoid valve and a syringe, and a second pressure sensor and an accumulator arranged in a pipe line connected between the dispensing solenoid value and an air supply so that an output is controlled in accordance with variation of an integral valve of pressure measured by the first pressure sensor integrated with a preset output time of the shifting output signal thereby controlling the dispensing of liquid based on the remaining amount of liquid in the syringe and the variation in the internal pressure in the syringe to accurately discharge the predetermined amount of liquid and prevent dripping of liquid from the syringe.

1 Claim, 3 Drawing Sheets

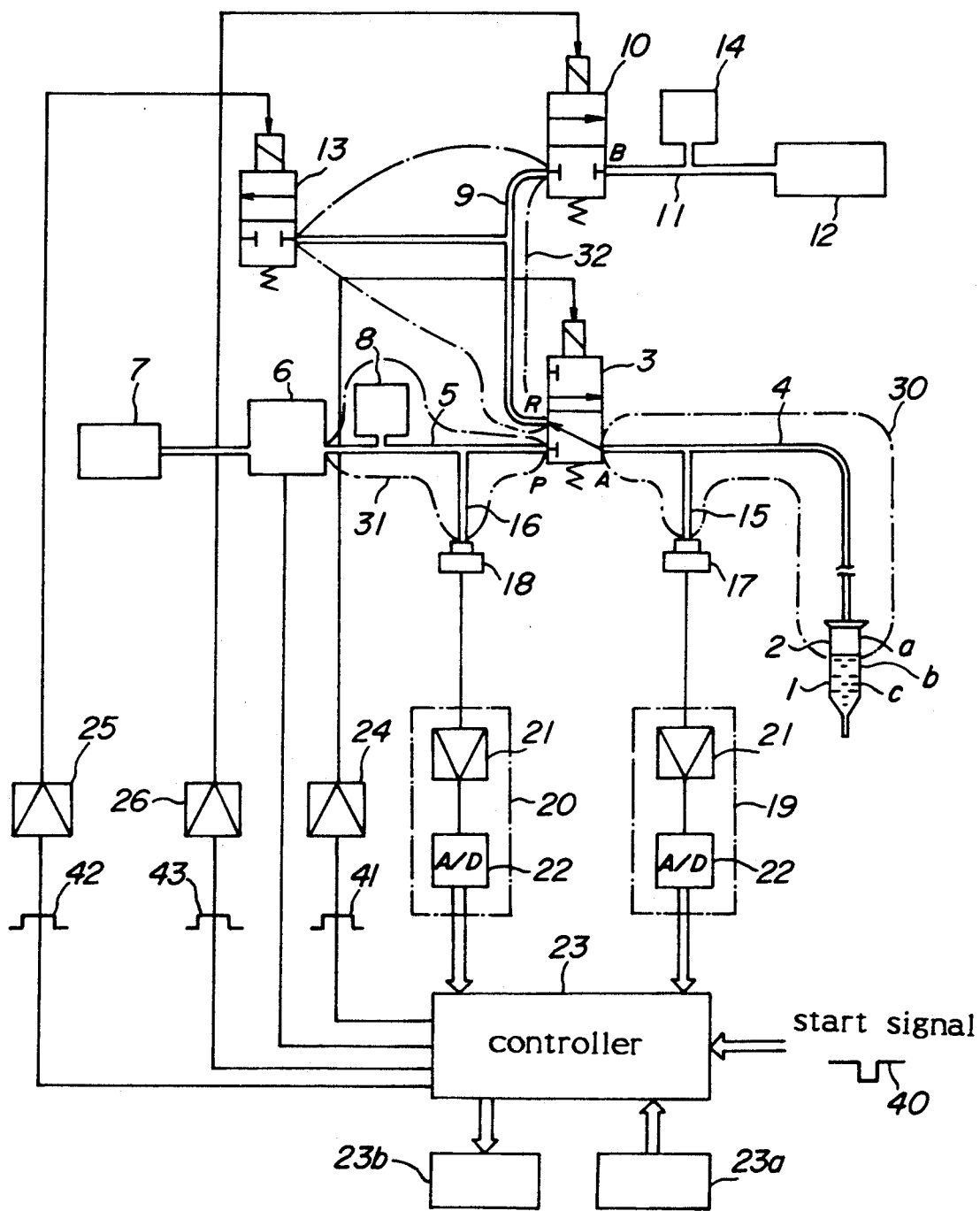
FIG_1

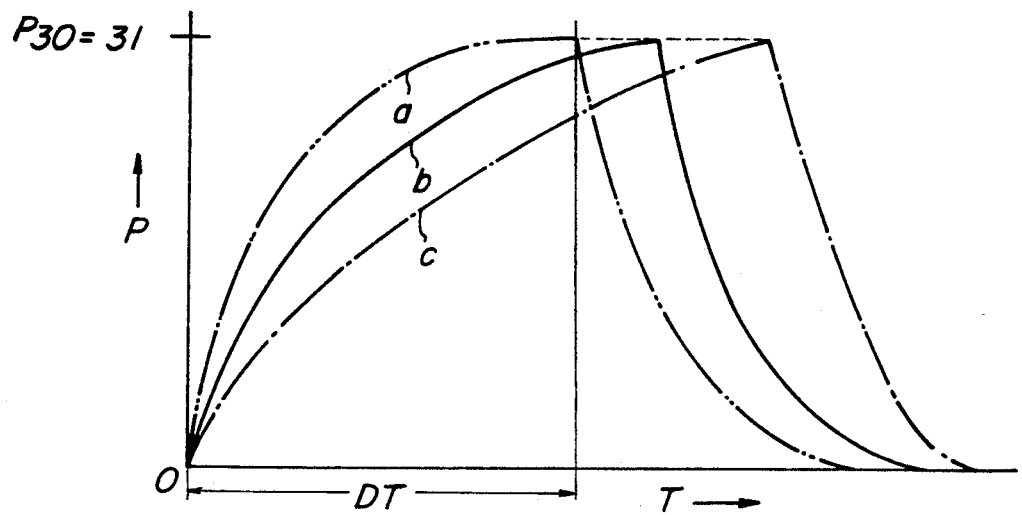
FIG_2
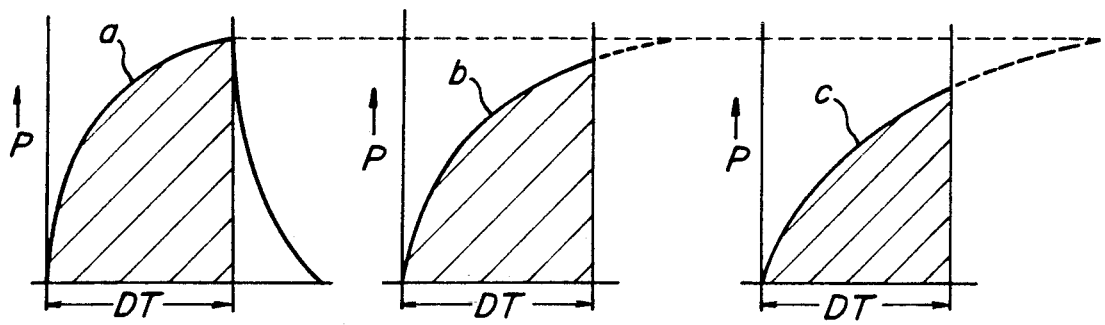
FIG_3

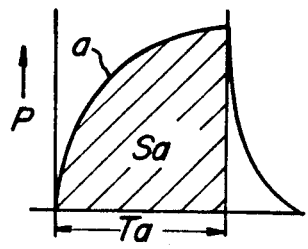
FIG_4a
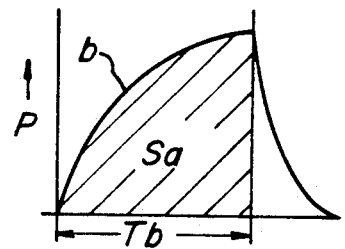
FIG_4b
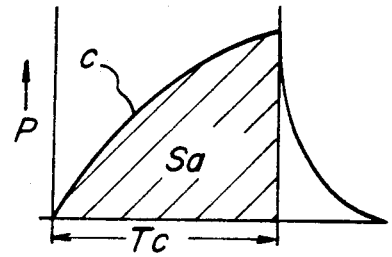
FIG_4c
PRIOR ART
FIG_5
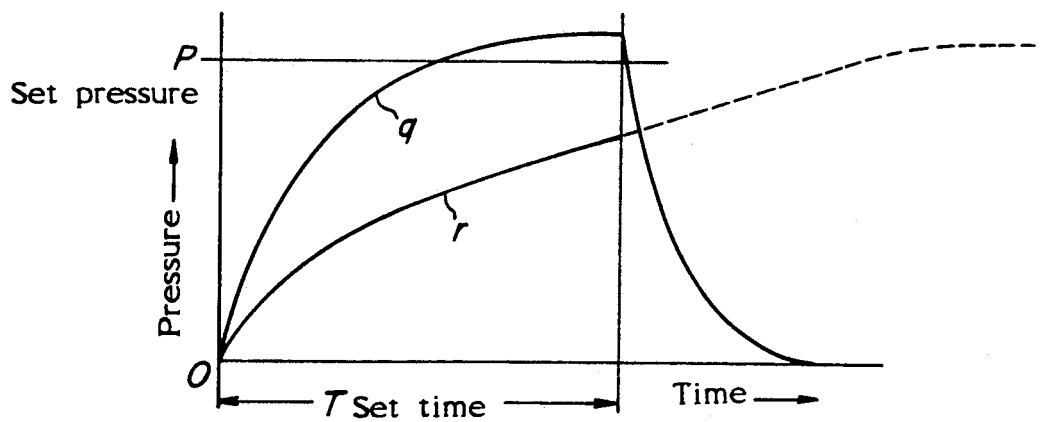

APPARATUS FOR METERING AND DISCHARGING A LIQUID

BACKGROUND OF THE INVENTION

The present invention relates to a liquid dispensing apparatus adapted for accurately metering and discharging a predetermined quantity of viscous liquid such as resin material, conductive adhesive, cream solder, UV resin, silver paste and the other paste like material used in coating, dotting, fixing and injecting processes.

A liquid dispensing apparatus discussed for example in Japanese patent application laid open 63-97259. This paste dispensing apparatus comprises a syringe containing a paste or the like, an air supply for supplying air under a positive pressure to the syringe, a dispensing solenoid valve arranged between the syringe and the air supply. The solenoid valve is connected to the syringe by means of a first pipe line and to the air supply by means of a second pipe line for communicating the syringe with the air supply when the paste is dispensed from the syringe. A first pressure sensor measure a pressure in the first pipe line and a second pressure sensor measures a pressure in the second pipe line. A controller having inputs for signals of measured pressure is connected to the first and second pressure sensor. The controller also has a voltage signal output for actuating the dispensing solenoid valve to connect the first and second pipe lines to each other at the start of dispensation. The controller controls a duration of the output voltage signal until the pressure measured by the first pressure sensor reaches a preset pressure after the first and second pipe lines are communicated to each other.

The aforementioned paste dispensing apparatus further comprises an air suction device connected to the dispensing solenoid valve by a third pipe line to connect the first and third pipe lines while the first and second pipe lines are not connected to each other. The air suction device supplies air under a negative pressure to the first pipe line to prevent the paste from dripping from the syringe after completion of dispensing.

The controller outputs a voltage signal that actuates the dispensing solenoid valve to supply a positive air pressure from the air supply to the syringe thereby dispensing the paste from the syringe. A variation in the pressure measured by the first pressure sensor in relation to the amount of paste remaining in the syringe is estimated by the controller so that the amount of the paste dispensed by the syringe is constant in spite of a variation in the amount of the paste remaining in the syringe.

The aforementioned paste dispensing apparatus can be controlled to dispense a predetermined amount of paste from the syringe when the air pressure in the syringe reaches a preset pressure P as shown by a curve q in FIG. 5. The aforementioned dispensing apparatus however cannot be controlled to accurately dispense the paste from the syringe when the air pressure in the syringe does not reach the preset pressure P as shown by a curve in FIG. 5 because of change or variation of syringe inner volume, pipe line inner diameter, or compressed pressure.

The present invention solves the foregoing problems and provides an improved liquid dispensing apparatus capable of dispensing a constant amount of liquid in spite of variations in the curve of air pressure in the syringe. The present invention also quickly and effectively prevents liquid from dripping out of the syringe between repeated dispensations of the liquid.

A liquid dispensing apparatus according to the present invention comprises a syringe containing liquid, an air supply for supplying air under a positive pressure to the syringe, a dispensing solenoid valve arranged between the syringe and the air supply, a first pipe line connecting the syringe to the dispensing solenoid valve, a second pipe line connecting the dispensing solenoid valve to the air supply, a first pressure sensor for measuring the internal pressure in the first pipe line, a second pressure sensor for measuring the internal pressure in the second pipe line, an accumulator connected to the second pipe line, and a controller having a shifting output signal to the dispensing solenoid valve. The controller controls an output time of the shifting output signal in accordance with variation of an integral value of pressure measured by the first pressure sensor integrated with a preset output time of the shifting output signal after the first and second pipe lines are connected by the dispensing solenoid valve.

The liquid dispensing apparatus according to the present invention may further comprise a suction solenoid valve connected to the dispensing solenoid valve by means of a third pipe line, an air suction source connected to the suction solenoid valve by means of a fourth pipe line, a vent solenoid valve connected to the third pipe line, and an accumulator connected to the fourth pipe line wherein each of the solenoid valves are connected to the controller.

In operation, the controller of the liquid dispensing apparatus according to the present invention outputs a shift signal of a voltage signal to the dispensing solenoid valve to supply air under a positive pressure from the air supply to the syringe for a duration corresponding to a quantity of liquid remaining in the syringe, to thereby accurately dispense liquid from the syringe. In order to supply air under positive pressure corresponding to the quantity of liquid in the syringe, an amount of liquid remaining in the syringe is determined by an integrated value of pressure measured by the first pressure sensor during a predetermined voltage signal output duration thereby permitting a determination of a required dispensing time. Thus, the controller outputs a voltage signal to the dispensing solenoid valve for the determined time to supply air under a positive pressure into the syringe.

According to the present invention, variation in the rising pressure curve caused by variation of quantity of liquid remaining in the syringe as measured by the first pressure sensor is detected as a variation in the integrated value during a set time. Accordingly, it is possible to prevent a problem occurring in the prior art which results from detection of the variation in the rising curve as a variation in the time required for reaching the set pressure.

According to another aspect of the present invention, the atmospheric pressure or a negative pressure from air suction devices is applied to the syringe simultaneously with the termination of the supply of air under a positive pressure to the syringe, so that the dripping of liquid from the syringe is effectively prevented.

According to another aspect of the present invention, the pressure measured at the beginning of the supply of air under pressure to the syringe until the internal pressure in the syringe reaches a preset pressure can be made even by means of an accumulator so that a duration of the output voltage signal from the controller can be controlled with high accuracy without any influence from variations in the positive pressure supplied from the air supply source. Specifically, the accumulator connected to the fourth pipe line can reduce the internal pressure in the syringe to a predetermined negative pressure in short time and prevent a variation in the internal pressure in the syringe which may be caused by pulsation in the air suction source. Furthermore, the vent opening solenoid valve connected to the third pipe line can open to reduce the internal pressure in the syringe to the atmospheric pressure in a very short time with less pipe friction and instantly stop the discharge of liquid out of the syringe to thereby greatly shorten the dispensing cycle time.

These and other objects, features and advantages of the present invention will become apparent upon consideration of the following Detailed Description of the Invention and the accompanying Drawings described below.

BRIEF DESCRIPTION OF THE DRAWINGS

FIG. 1 is a circuit diagram showing an embodiment of the present invention;

FIG. 2 is a graph showing a relationship between discharge pressure time;

FIG. 3 is a comparative diagram showing an integral value of measured pressure during a preset output time;

FIGS. 4a-4e are comparative diagrams showing a variation of voltage signal output with time when the integral value of measured pressure is a constant; and FIG. 5 is a graph of the prior art.

DETAILED DESCRIPTION OF THE INVENTION

FIG. 1 is a circuit diagram according to an embodiment of the present invention showing liquid 1 to be dispensed from a filled syringe 2. The syringe 2 is connected to a port "A" of a dispensing solenoid valve 3 which may be a two position type valve having three ports by means of a first pipe line 4. An inlet port "P" of the dispensing solenoid valve 3 is connected to an air supply 7 via a reducing valve 6 by means of a second pipe line 5 to which is connected an accumulator 8 which is interposed between the dispensing solenoid valve 3 and the reducing valve 6.

The dispensing solenoid valve 3 is arranged so that the port "A" and an outlet port "R" communicate with each other when a voltage signal is not supplied to the valve 3 as a shift signal. The port "A" and the inlet port "P" communicate with each other when the voltage signal is supplied to the valves.

In this embodiment, the outlet port "R" of the dispensing solenoid valve 3 is connected to one of two ports of a suction solenoid valve 10 which may be a two position type valve by means of a third pipe line 9. Another port "B" of the suction solenoid valve 10 is connected to an air suction source 12 by means of a fourth pipe line 11. The third pipe line 9 is also connected with a vent solenoid valve 13 which may be a two position type valve having two ports. The fourth pipe line 11 is connected with an accumulator 14.

Both the suction solenoid valve 10 and the vent solenoid valve 13 have an open position upon application of a voltage signal and a closed position upon removal of the voltage signal.

The first pipe line 4 is connected with a first pressure sensor 17 by means of a pipe line 15. The second pipe line 5 is connected at the downstream side of the accumulator 8 with a second pressure sensor 18 by means of a pipe line 16. The pressure sensors 17 and 18 detect individual pressure in the pipe lines 4 and 5, respectively, and convert them to electrical signals. The electrical signals are then input to conversion circuits 19 and 20, respectively. The conversion circuits 19 and 20 each include amplifier circuits 21 for amplifying and calibrating the output signals from the pressure sensors 17 and 18, and A/D convertors 22 for converting analog signals of the measured pressure to a plurality of binary digital signals. The convertor circuits 19 and 20 output signals to a controller 23 which may be a microprocessor or a one chip computer.

The controller 23 outputs a voltage signal 41 to the dispensing solenoid valve 3 upon receiving a dispensing start signal 40. The controller 23 also outputs voltage signals 42 and 43 to the vent solenoid valve 13 and the suction solenoid valve 10, respectively, after the voltage signal has been terminated. The voltage signals 41, 42 and 43 are amplified by amplifier circuits 24, 25 and 26 and then input to the solenoid valves 3, 10 and 13, respectively.

The controller 23 includes setting switches 23a adapted for setting time and the other conditions and a display 23b for preset data. The setting switches 23a are, for example, a switch for setting an opening time of the dispensing solenoid valve 3 necessary for dispensing a predetermined amount of liquid 1, a switch for setting a parameter for increasing or decreasing the discharge time corresponding to a variation in the pressure measured by the first pressure sensor 17 when the remaining amount of the liquid in the syringe changes, switches for setting an opening time of the suction solenoid valve 10 and the vent solenoid valve 13, and a switch for setting a negative pressure necessary for a space 30 including a space above the liquid 1 in the syringe and spaces in the pipe lines 4 and 15. The set data display 23b displays the time, conditions or the other data set by the setting switch 23a, and pressure in the spaces 30 and 31 detected by the pressure sensors 17 and 18.

For simplifying the following description, it is assumed that a space 31 includes a space between the dispensing solenoid valve 3 and the reducing valve 6 in the pipe line 5, a space in the accumulator 8 and a space in the pipe line 16. It is also assumed that a space 32 includes a space in the third pipe line 9 and a space in the pipe line between the pipe line 9 and the vent solenoid valve 13.

The operation of the above embodiment of the present invention will now be explained.

Usually, the dispensing solenoid valve 3 is configured so that the port "A" is connected with the outlet port "R" and therefore the pressure in the space 30 is the same as the pressure in the space 32. The pressure in the space 31 is maintained at a predetermined pressure by regulating the compressed air from the air supply 7 by means of the reducing valve 6 controlled by a control signal from the controller 23.

The internal pressure in the spaces 30 and 31 is detected by pressure sensors 17 and 18, respectively and displayed in the set data display 23b.

Under the above conditions, a dispensing start signal 40 is input to the controller 23 which then generates an output voltage signal 41 received by the dispensing solenoid valve 3. The port "A" is communicated with the inlet port "P" in the dispensing solenoid valve 3 to apply the internal pressure in the space 31 to the space 30. Thus, the compressed air is supplied to the syringe 2 to dispense liquid 1 from the syringe 2.

The time required for the pressure in the space 30 to reach the same pressure in the space 31 varies depending on the quantity of the liquid remaining in the syringe 2 as shown in FIG. 2. In order to dispense a constant amount of liquid from the syringe 2 it is necessary to vary the period or time of the voltage output signal from the controller 23 to the dispensing solenoid valve 3 as discussed below.

Referring to FIG. 2, the ideal pressure measured by the first pressure sensor 18 is shown by a curve "a" in a case that syringe 2 is fully filled with liquid. Curve "b" is a pressure curve measured in a case that syringe 2 is filled with less liquid than the case of the curve "a", and a curve "c" is a pressure curve measured in a case where the syringe 2 contains less liquid than in the case of the curve "b". In FIG. 2, DT is a preset dispensing time, in other words a preset output time for the voltage signal 41.

The remaining amount of liquid 1 in the syringe is determined by an integrated value of each of the curves a, b and c during the preset dispensing time. The integrated value is actually an accumulated value of measured pressure for every unit time by the controller 23. The integrated value of each of the curves a, b and c gets smaller as the amount of liquid remaining in the syringe is smaller as shown by the hatched portion in FIG. 3. The integrated values are compared or conversed with each other and with one or more preset values in the controller 23 to determine the amount of liquid remaining in the syringe for every dispensation of liquid 1. Accordingly, the syringe may be replaced with a new filled syringe when the integrated value decreases to a minimum value preset in the controller 23. The set data display 23b or alarm may be used to indicate when the amount of liquid remaining in the syringe reaches the preset minimum.

Thus, the output time of the voltage signal to the dispensing solenoid valve 3, for example the output time Ta, Tb and Tc of curves a, b and c as shown in FIG. 4, is based on the variation of the integrated value caused by the remaining amount of liquid in the syringe as discussed above and is set in the following manner. First, when a pressure variation shown by one of the curves, for example the curve a was obtained, a voltage signal output time Ta which is required for dispensing a predetermined amount of liquid 1 out of the syringe is determined by experiments. Then the other output times Tb and Tc for the curves b and c are calculated so as to bring the same integrated value as the integrated value of the curve a in the output time Ta. For example, as shown in FIG. 4, the integrated value of the curve a in the output time Ta is measured and determined to be Sa. The output times Tb and Tc are then determined so that the integral value for the curves b and c is equal to Sa, the integral value of curve a. Thus determined output times Ta, Tb and Tc are preset in the controller 23 with respect to the amount of liquid remaining in the syringe. Therefore, the voltage signal output time for the dispensing solenoid valve 3 based on the detection of the amount of liquid remaining in the syringe can be controlled to dispense a predetermined constant amount of liquid from the syringe 2 with high accuracy in spite of the variation in the amount of liquid remaining in the syringe.

When the amount of liquid remaining in the syringe is detected and the output time of the voltage signal 41 for the dispensing solenoid valve is determined as aforementioned, it is especially important to prevent the disturbance of the measured pressure in the space 30. Therefore, the second pipe line 5 is provided at the downstream side of the reducing valve 6 with an accumulator for preventing the disturbance of the measured pressure in the space 30 to enable accurate detection of the amount of liquid remaining and control the voltage output signal.

The voltage output signal 41 to the dispensing solenoid valve 3 is terminated after expiration of the preset output time and at the same time the port "A" and the outlet port "R" of the dispensing solenoid valve are connected with each other to connect the space 30 and the space 32 with each other to reduce the internal pressure in the syringe 2 to thereby stop the dispensation of liquid 1. In order to stop the dispensation of the liquid 1 when the output of the voltage signal is terminated, it is necessary to immediately reduce the internal pressure in the space 30 to at least the atmospheric pressure. Thus, when the output of the voltage signal 41 is terminated, at the same time or at an earlier time, the controller 23 outputs a voltage signal 42 to open the vent solenoid valve 13 and thereby quickly reduce the internal pressure in the space 30 and the syringe. A similar effect may be attained by opening the suction solenoid valve 10 at the same time as mentioned above with respect to the vent solenoid valve 13. In this case, however, a time for introducing negative pressure into the space 32 is longer than that of the aforementioned case due to a resistance in the passage. Therefore, it is preferable to use the vent solenoid valve to immediately stop the drip of the liquid 1 and to move the syringe 2 to the next dispensing position as this shortens the time for pressurizing the internal pressure in the syringe to the predetermined pressure for the next dispensation. In case of relatively long cycle time, that is the time from the end of a dispensation of liquid 1 to the start of the next dispensation or a temporary stop of the apparatus, it is preferable to maintain a negative pressure in the space 32 and therefore the space 30 by opening the suction solenoid valve 10 after closing the vent solenoid valve 13 or by using only the suction solenoid valve 10 without use of the vent solenoid valve 13 in such a manner that when the output of the voltage signal 41 is terminated, the suction solenoid valve 10 is simultaneously opened. In this case, the accumulator 14 in the fourth pipe line 11 effectively acts to prevent the dripping of the liquid 1 from the syringe until the internal pressure in the space 30 reaches a negative pressure since the accumulator 14 quickly reduces the internal pressure in the space 30 and removes an influence of pulsation from the suction source to improve stability of negative pressure until the internal pressure in the space 30 reaches the negative pressure.

When the negative pressure measured by the first pressure sensor 17 reaches a predetermined pressure, the voltage signal 43 is terminated to close the suction solenoid valve 10.

If the space is maintained in a perfectly closed condition, the drip of liquid 1 is prevented for a long time. However, there is some leakage from the spaces 30 and 32 through the dispensing solenoid valve 3, the suction solenoid valve 10 and the other valves and connections so that the internal pressure in the space 30 may be brought to the atmospheric pressure after a time and as a result the liquid may drip from the tip of the syringe 2 by its own weight. Thus, when the internal pressure measured by the first pressure sensor 17 approaches the atmospheric pressure, the controller 23 outputs a voltage signal 43 to again open the suction solenoid valve 10, thereby maintaining the predetermined negative pressure in the space 31.

The preferred predetermined negative pressure is variable according to the amount of liquid remaining in the syringe. Therefore, the output time of the voltage output signal from the controller 23 to the suction solenoid valve 10 can be controlled by the controller based on the aforementioned result of detecting the amount of liquid remaining in the syringe to adjust the predetermined negative pressure according to the weight of the remaining liquid so as to effectively prevent the liquid from dripping.

Thus, the variation of pressure measured by the first pressure sensor caused by variation of the remaining amount of liquid 1 in the syringe is detected as the variation of the integrated value of the measured pressure during the preset time and then the output to the dispensing solenoid valve 3 is controlled in accordance with the variation of the integrated value to accurately dispense the predetermined amount of liquid from the syringe in spite of any variation in the amount of liquid remaining in the syringe, the volume of the syringe, the diameter of the pipe lines, and variation of air pressure. Furthermore, the problem of low liquid level in the syringe is satisfactorily resolved because the syringe 2 can be exchanged by accurately determining the remaining amount of liquid in the syringe from the integrated value of the measured pressure. Furthermore, the dispensation of an excess amount of liquid is effectively prevented and the dripping of liquid from the tip of the syringe 2 is satisfactorily prevented by applying the atmospheric pressure or a predetermined negative pressure to the syringe 2 when the liquid 1 is not to be dispensed. In particular, the cycle time of dispensing can be shortened to thereby markedly improve the operating efficiency by reducing the internal pressure in the syringe to the atmospheric pressure. Moreover, liquid dispensing accuracy can be improved by providing the accumulator 8 in the second pipe line 2, and dripping of liquid from the syringe 2 can be more effectively prevented by providing the accumulator 14 in the fourth pipe line 11.

The invention has been described by reference to the drawings showing an exemplary embodiment. In an alternative embodiment the reducing valve 6 may be eliminated from the second pipe line 5. As mentioned above, according to the present invention, a predetermined amount of liquid can be dispensed with high accuracy in spite of the amount of liquid remaining in the syringe and the gradient of the curve of the internal pressure in the syringe. Furthermore, according to the present invention the remaining amount of liquid in the syringe can be accurately detected. Therefore, any problem that the liquid is not dispensed is effectively prevented and the syringe can be properly exchanged with a new syringe. Moreover, the disadvantage that the liquid in the syringe is dispensed in an excessive amount or dripped from the syringe is satisfactorily prevented.

The liquid dispensing apparatus according to the present invention is preferable in use for applying a cream solder to electronic circuit boards, dotting resin material on lead frames, coating a junction with resin material, coating silver paste on contacts or the like, filling resin material in magnetic heads, injecting resin material to LEDs, applying lubricant to precision devices, injecting liquid crystal to liquid crystal displays, applying adhesive on speaker cone papers, molding electronic parts or sealing electronic parts.

The foregoing is a description enabling one of ordinary skill in the art to make and use the preferred embodiments of the present invention. It will be appreciated by those skilled in the art that there exists variations, modifications, and other equivalents to the embodiments disclosed herein. The present invention therefore is to be limited only by the scope of the appended claims.

I claim:

1. A liquid dispensing apparatus comprising:
   a syringe containing liquid;
   an air supply coupled to the syringe for supplying air under a positive pressure to the syringe;
   a dispensing solenoid valve disposed between the syringe and the air supply;
   a first pipe line disposed between the syringe and the dispensing solenoid valve;
   a second pipe line disposed between the dispensing solenoid valve and the air supply;
   a first pressure sensor for measuring the internal pressure in the first pipe line;
   a second pressure sensor for measuring the internal pressure in the second pipe line;
   an accumulator coupled to the second pipe line;
   a controller means for outputting a shifting output signal to the dispensing solenoid valve and for controlling an output time of the shifting output signal in accordance with a variation of an integral value of pressure measured by the first pressure sensor integrated during a preset output time of the shifting output signal after communicating with the first and second pipe lines;
   a suction solenoid valve coupled to the dispensing solenoid valve by a third pipe line;
   an air suction source coupled to the suction solenoid valve by a fourth pipe line;
   a vent solenoid valve coupled to the third pipe line; and
   an accumulator coupled to the fourth pipe line, each of the solenoid valves being coupled to the controller.

* * * * *